(12) United States Patent
Bagheri et al.

(10) Patent No.: US 9,974,032 B2
(45) Date of Patent: *May 15, 2018

(54) SYSTEM AND METHOD FOR POWER CONTROL COMMAND FOR DEVICE-TO-DEVICE TRANSMISSIONS

(71) Applicant: Futurewei Technologies, Inc., Plano, TX (US)

(72) Inventors: Hossein Bagheri, Urbana, IL (US); Mazin Al-Shalash, Frisco, TX (US); Philippe Sartori, Plainfield, IL (US); Anthony C. K. Soong, Plano, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/377,525

(22) Filed: Dec. 13, 2016

(65) Prior Publication Data

US 2017/0094616 A1 Mar. 30, 2017

Related U.S. Application Data

(63) Continuation of application No. 14/704,382, filed on May 5, 2015, now Pat. No. 9,642,099.
(Continued)

(51) Int. Cl.
*H04W 52/38* (2009.01)
*H04W 76/02* (2009.01)
(Continued)

(52) U.S. Cl.
CPC ....... *H04W 52/383* (2013.01); *H04W 52/243* (2013.01); *H04W 52/38* (2013.01);
(Continued)

(58) Field of Classification Search
CPC ... H04W 52/383; H04W 52/10; H04W 52/08; H04W 52/325; H04W 52/54;
(Continued)

(56) References Cited

U.S. PATENT DOCUMENTS 8,971,950 B2    3/2015   Lamm et al.
9,642,099 B2 *   5/2017   Bagheri .............. H04W 52/383
(Continued)

FOREIGN PATENT DOCUMENTS

NO    2014018333 A2    1/2014

OTHER PUBLICATIONS

LTE; Evolved Universal Terrestrial Radio Access (E-UTRA); Physical Layer Procedures (3GPP TS 36.213 Version 12.5.0 Release 12), Apr. 2015, 242 pages.
(Continued)

*Primary Examiner* — Diane Mizrahi
(74) *Attorney, Agent, or Firm* — Slater Matsil, LLP

(57) ABSTRACT

A transmit power control rule for device-to-device (D2D) transmissions may not be necessary during periods in which no uplink transmissions are scheduled to be received by an enhanced Node B base station (eNB). When uplink transmissions are not scheduled to be received by the eNB, the eNB may send a transmit power control (TPC) command to a D2D capable user equipment (D2D UE) that instructs the D2D UE to perform a D2D transmission at a pre-defined transmit power level (e.g., maximum transmit power level). When uplink transmissions are scheduled to be received the eNB, the eNB may send a TPC command to the D2D UE that instructs the D2D UE to perform a D2D transmission at a transmit power level defined by a power control rule.

22 Claims, 7 Drawing Sheets

Related U.S. Application Data

(60) Provisional application No. 61/990,510, filed on May 8, 2014.

(51) Int. Cl.
| | | |
|---|---|---|
| *H04W 52/54* | (2009.01) | |
| *H04W 52/24* | (2009.01) | |
| *H04W 92/18* | (2009.01) | |
| *H04W 88/10* | (2009.01) | |
| *H04W 88/06* | (2009.01) | |
| *H04W 52/08* | (2009.01) | |
| *H04W 52/10* | (2009.01) | |
| *H04W 52/32* | (2009.01) | |
| *H04W 52/22* | (2009.01) | |
| *H04W 72/04* | (2009.01) | |
| *H04W 72/08* | (2009.01) | |

(52) U.S. Cl.
CPC ........... *H04W 52/54* (2013.01); *H04W 76/02* (2013.01); *H04W 76/023* (2013.01); *H04W 92/18* (2013.01); *H04W 52/08* (2013.01); *H04W 52/10* (2013.01); *H04W 52/223* (2013.01); *H04W 52/325* (2013.01); *H04W 52/386* (2013.01); *H04W 72/042* (2013.01); *H04W 72/0473* (2013.01); *H04W 72/0493* (2013.01); *H04W 72/082* (2013.01); *H04W 88/06* (2013.01); *H04W 88/10* (2013.01)

(58) Field of Classification Search
CPC . H04W 52/223; H04W 52/243; H04W 52/38; H04W 52/386
See application file for complete search history.

(56) References Cited

U.S. PATENT DOCUMENTS

| | | |
|---|---|---|
| 2003/0068984 A1 | 4/2003 | Shin et al. |
| 2003/0198279 A1 | 10/2003 | Zeira et al. |
| 2004/0214593 A1 | 10/2004 | Shin et al. |
| 2006/0050798 A1 | 3/2006 | Odigie et al. |
| 2009/0325625 A1 | 12/2009 | Hugl et al. |
| 2010/0002654 A1 | 1/2010 | Lindoff et al. |
| 2013/0310103 A1 | 11/2013 | Madan et al. |
| 2014/0051470 A1 | 2/2014 | Patil et al. |
| 2014/0087744 A1 | 3/2014 | Yang et al. |
| 2015/0223141 A1 | 8/2015 | Chatterjee et al. |

OTHER PUBLICATIONS

"RAN1 Chairman's Notes," 3GPP TSG RAN WG1 Meeting #73, Fukuoka, Japan, May 20-24, 2013, 52 pages.

"RAN1 Chairman's Notes," 3GPP TSG RAN WG1 Meeting #76, Prague, Czech Republic, Feb. 10-14, 2014, 56 pages.

"RAN1 Chairman's Notes," 3GPP TSG RAN WG1 Meeting #76bis, Shenzhen, China, Mar. 4-31, 2014, 49 pages.

Doppler, et al., "Device-to-Device Communication as an Underlay to LTE-Advanced Networks," Topics in Radio Communications, IEEE Communications Magazine, Dec. 2009, 8 pages.

Phunchongharn, et al., "Resource Allocation for Device-to-Device Communications Underlaying LTE-Advanced Networks," Accepted from Open Call, IEEE Wireless Communications, Aug. 2013, 10 pages.

Alcatel-Lucent Shanghai Bell, et al., "Consideration of Interference Mitigation for D2D Communication," 3GPP TSG-RAN1 Meeting #74, R1-132993, Barcelona, Spain, Aug. 19-23, 2013, 4 pages.

\* cited by examiner

US 9,974,032 B2

SYSTEM AND METHOD FOR POWER CONTROL COMMAND FOR DEVICE-TO-DEVICE TRANSMISSIONS

This patent application is a continuation of U.S. Non-Provisional application Ser. No. 14/704,382, filed on May 5, 2015, which claims priority to U.S. Provisional Application No. 61/990,510, filed on May 8, 2014, entitled "System and Method for Power Control Command for D2D Transmissions," both of which are hereby incorporated by reference herein as if reproduced in its entireties.

TECHNICAL FIELD

The present invention relates to a system and method for wireless communications, and, in particular embodiments, to a system and method for power control command for device-to-device transmissions.

BACKGROUND

Device-to-device (D2D) transmission techniques provide direct communications between user equipments (UEs). D2D transmission techniques may increase system capacity and spectral efficiency, for instance by offloading local communications from an enhanced Node B (eNB). In addition, D2D transmission techniques may also provide a direct connection between neighboring UEs when an indirect connection via an eNB is undesirable or unavailable.

There are two main steps to establish D2D transmissions. In the first step, a device-to-device capable user equipment (D2D UE) attempts to discover neighboring UEs. In the second step, the D2D UE directly communicates data with neighboring UEs without the data relaying through the eNB. Discovery can be performed as a standalone operation. D2D direct communication can be performed following D2D discovery.

D2D transmissions may be communicated over uplink resources, and therefore have the potential to interfere with uplink signals received at nearby eNBs. Accordingly, an efficient power control scheme for D2D transmissions that mitigates interference to neighboring UEs and nearby eNBs is desired.

SUMMARY OF THE INVENTION

Technical advantages are generally achieved, by embodiments of this disclosure which describe system and method for power control command for device-to-device transmissions.

In accordance with an embodiment, a method for power control command for device-to-device (D2D) communications in a wireless communication network is provided. In this example, the method comprises establishing a link with a first user equipment (UE) in a cell. The first UE is configured to perform a D2D transmission to one or more UEs. The method further comprises sending a transmit power control (TPC) command to the first UE. The TPC command instructing the first UE to perform the D2D transmission either at a pre-defined transmit power level or at a transmit power level defined by a power control rule. An apparatus for performing this method is also provided.

In accordance with another embodiment, another method for power control command for device-to-device (D2D) communications in a wireless communication network is provided. In this example, the method comprises receiving a TPC command from a base station. The TPC command instructs the first UE to perform a D2D transmission either at a pre-defined transmit power level or at a transmit power level defined by a power control rule. The method further comprises performing the D2D transmission using the pre-defined transmit power level when the TPC command instructs the first UE to perform the D2D transmission at the pre-defined transmit power level. The method further comprises performing the D2D transmission at the transmit power level defined by the power control rule when the TPC command instructs the UE to perform the D2D transmission at the transmit power level defined by the power control rule. An apparatus for performing this method is also provided.

In accordance with yet another embodiment, a method for power control command for setting a transmit power level in a D2D transmission is provided. In this example, the method comprises receiving a TPC command from a base station. The TPC command instructs the first UE to perform a D2D transmission either at a pre-defined transmit power level or at a transmit power level defined by a power control rule. The method further comprises obtaining the transmit power level in accordance with $P_{D2D}=\min \{P_{CMAX,D2D}, 10 \log_{10}(M)+P_{O\_D2D,1}+\alpha \cdot PL\}$ [dBm], where $P_{CMAX,D2D}$ is a maximum power level of a D2D communication channel, M is a bandwidth of a D2D communication channel resource assignment, PL is a downlink path loss estimate calculated for a serving cell, and $P_{O\_D2D}$ and $\alpha$ are provided by higher layer parameters. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
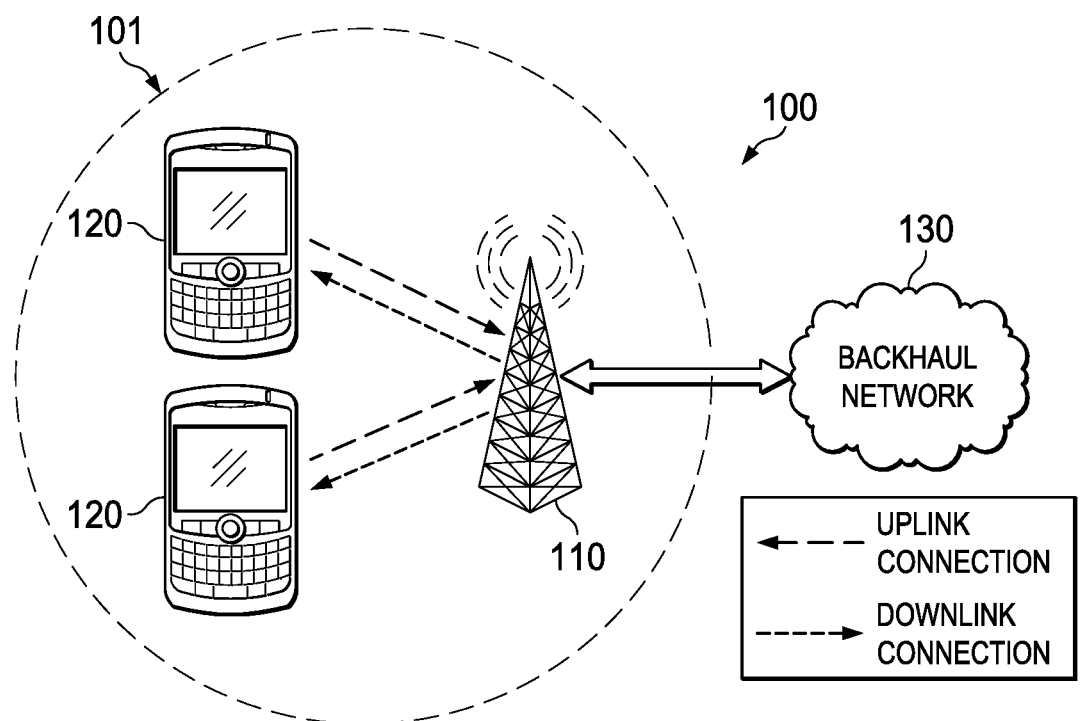
FIG. 1 illustrates a diagram of an embodiment wireless network.

The structure, manufacture and use of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A base station may communicate transmit power control (TPC) commands to user equipments (UEs) to instruct the UEs to regulate their transmit power level based on transmit power control algorithms/rules. For D2D transmissions, transmit power control rules may typically specify relatively low transmit power levels for UEs located nearby the eNB to mitigate interference between the UE's D2D transmissions and uplink transmissions being received by the eNB from UEs. However, restricting the D2D UE to low power D2D transmissions may be unnecessary during periods in which no uplink transmissions are scheduled to be received by the eNB. In addition, the eNB may tolerate a predetermined amount of interference from D2D transmissions to improve D2D transmission performance. This may be beneficial when the D2D transmissions are used for the purpose of public safety. Thus, regulating D2D transmissions using a transmit power control rule may unnecessarily constrain D2D performance (e.g., throughput, range, etc.) during periods in which no uplink transmissions are received by the eNB. In such cases, it may be desirable to improve D2D performance and/or range by using a pre-defined transmit power level (e.g., a maximum transmit power level) to perform D2D transmissions.

Aspects of this disclosure provide an embodiment TPC command that instructs a D2D UE to perform a D2D transmission either at a pre-defined transmit power level or based on a power control rule depending on whether uplink transmissions are scheduled to be received by an eNB during a specific period. The TPC command may instruct the D2D UE to perform the D2D transmission at the pre-defined transmit power level (e.g., a maximum transmit power level) when there is no uplink transmissions scheduled to be received by the eNB over time-frequency resources available to carry the D2D transmission. Conversely, the TPC command may instruct the D2D UE to perform a D2D transmission at a transmit power level defined by a power control rule when uplink transmissions are scheduled to be received by the eNB over time-frequency resources available to carry the D2D transmission. The TPC command may be transmitted in a physical downlink control channel (PDCCH) or an enhanced PDCCH (ePDCCH) using a downlink control information (DCI) format. In one embodiment, a DCI format 3/3A (as defined in LTE specifications) may carry a TPC command that enables/disables a transmit power control rule for a D2D UE. The TPC command may carry a new radio network temporary identifier (RNTI) (referred to as a D2D-TPC-RNTI) to identify the D2D UE and/or to distinguish the new TPC command from existing control commands (e.g., LTE control commands). In another embodiment, a new DCI format (e.g., DCI format 5) may be defined to instruct the D2D UE to perform the D2D transmission to neighboring UE at either a pre-defined transmit power level or a transmit power level defined by a power control rule. In addition, the eNB may notify the UE about a specific period for which the UE's D2D transmissions can be communicated at a pre-defined transmit power. In one embodiment, the eNB communicates the specific period to the D2D UE via a parameter in a downlink control channel. In another embodiment, the eNB communicates the time interval to the D2D UE using higher-layer signaling. As a result, the D2D UE may use a pre-defined transmit power level to perform D2D transmissions during the specific period. These and other details are described in greater detail below.

Figure 2:
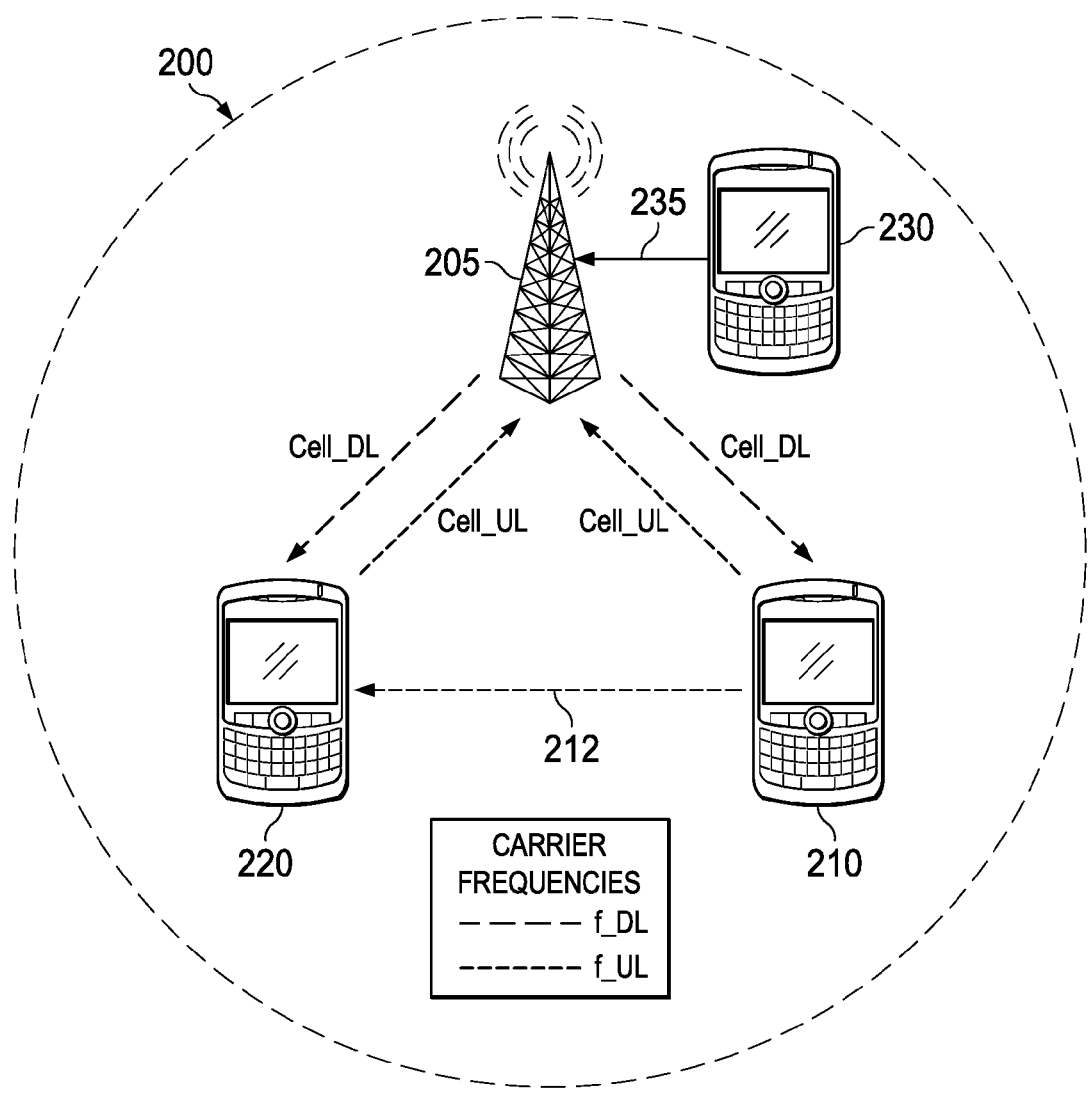
FIG. 2 illustrates a diagram of an embodiment wireless network for supporting direct device-to-device (D2D) communication.

FIG. 1 illustrates a wireless network 100 for communicating data. The wireless network 100 includes an access point (AP) 110 having a coverage area 101, a plurality of mobile devices 120, and a backhaul network 130. The AP 110 may comprise any component capable of providing wireless access by, among other things, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110, such as a mobile phone, a mobile station or other wirelessly enabled devices. The backhaul network 130 may be any component or collection of components that allow data to be exchanged between the AP 110 and a remote end. In some embodiments, there may be multiple such networks, and/or the network may comprise various other wireless devices, such as relays, low power nodes, etc. FIG. 2 illustrates a wireless network 200 for supporting direct D2D communications. As shown, the wireless network 200 comprises an eNB 205 and a plurality of UEs 210, 220, 230. In this example, the UE 210 performs a D2D transmission 212 to the UE 220. Oftentimes, the eNBs will be operated by, or under the control of, a wireless service provider, and hence may allow the wireless service provider to monitor and/or control various aspects of a direct D2D communication between a pair of UEs. For instance, one or both of the UEs 210, 220 may establish a cellular uplink (Cell_UL) connection with the eNB 205, thereby allowing the wireless service provider to monitor various aspects of the D2D transmission 212. Likewise, the eNB 205 may establish a cellular downlink (Cell_DL) connection with one or both of the UEs 210, 220, thereby allowing the wireless service provider to control various aspects of the D2D communication. The D2D transmission 212 may be communicated over uplink resources (e.g., uplink frequencies, etc.), and therefore may interfere with uplink signals being received by the eNB 205. For example, the D2D transmission 212 may interfere with an uplink transmission 235 from the UE 230. This interference may be particularly problematic when the UE 210 is positioned nearby the eNB 205. Interference may also be present when the UE 210 is located somewhat further from the eNB 205, but uses a high transmit power level. The UE 210 may perform the D2D transmission 212 using a transmit power level defined by a transmit power control algorithm/rule (e.g., open-loop power control algorithm defined in LTE specifications). The transmit power control algorithm may constrain a transmit power level of the D2D transmission 212 to mitigate interference between the D2D transmission 212 and the uplink transmission 235. However, constraining the transmit power level of the D2D transmission 212 in accordance with the transmit power control rule may unnecessarily reduce D2D performance during periods in which no uplink transmissions are scheduled to be received by the eNB 205.

Figure 3:
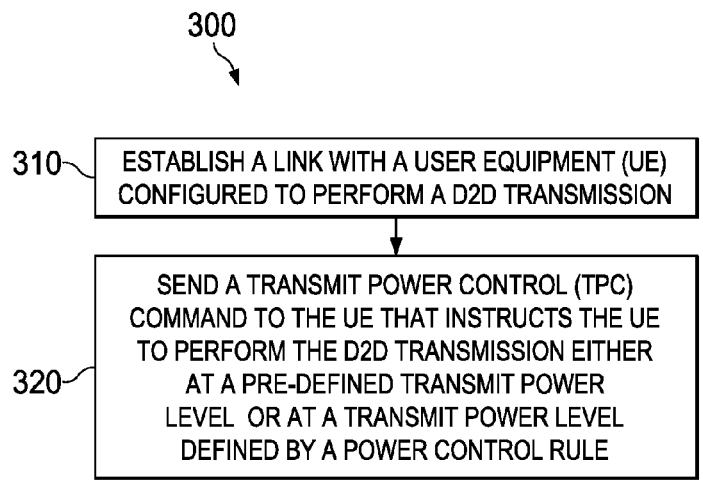
FIG. 3 illustrates a flow chart of an embodiment method for regulating a transmit power level of D2D transmissions.

Aspects of this disclosure address this issue by providing a transmit power control (TPC) command that instructs the UE 210 to perform D2D transmissions at a pre-defined transmit power level (e.g., a maximum transmit power level) during a periods in which no uplink transmissions are scheduled to be received. FIG. 3 illustrates a flow chart of an embodiment method 300 for regulating transmit power levels of D2D transmissions, as might be performed by an eNB. As shown, the method 300 begins at step 310, where the eNB establishes a link with a UE that is configured to perform a D2D transmission. Subsequently, the method 300 proceeds to step 320, where the eNB sends a transmit power control (TPC) command that instructs the UE to perform the D2D transmission at either a pre-defined transmit power level or a transmit power level defined by a transmit power control rule. The TPC command may instruct the UE to perform the D2D transmission at the pre-defined transmit power level when no uplink transmissions are scheduled to be received by the eNB. Alternatively, the eNB transmitting the TPC command may instruct the UE to perform the D2D transmission at the transmit power level defined by the power control rule when uplink transmissions are scheduled to be received by the eNB. In an embodiment, parameters of the power control rule (e.g., open-loop power control rule, closed-loop power control rule, etc.) are configured by higher layer signaling. The TPC command may instruct the UE to use the pre-defined power level, or the power control rule, for a specific period (e.g., T subframes). The specific period may be specified by a parameter in the TPC command. Alternatively, the specific period may be communicated to the UE via higher-layer signaling. The TPC command may be transmitted on a physical downlink control channel (PDCCH) and/or an enhanced physical downlink control channel (EPDCCH). The TPC command may be communicated using a downlink control information (DCI) format e.g., a new DCI format, an existing DCI format carrying a new radio network temporary identifier (RNTI) associated with a D2D UE, etc.

Figure 4:
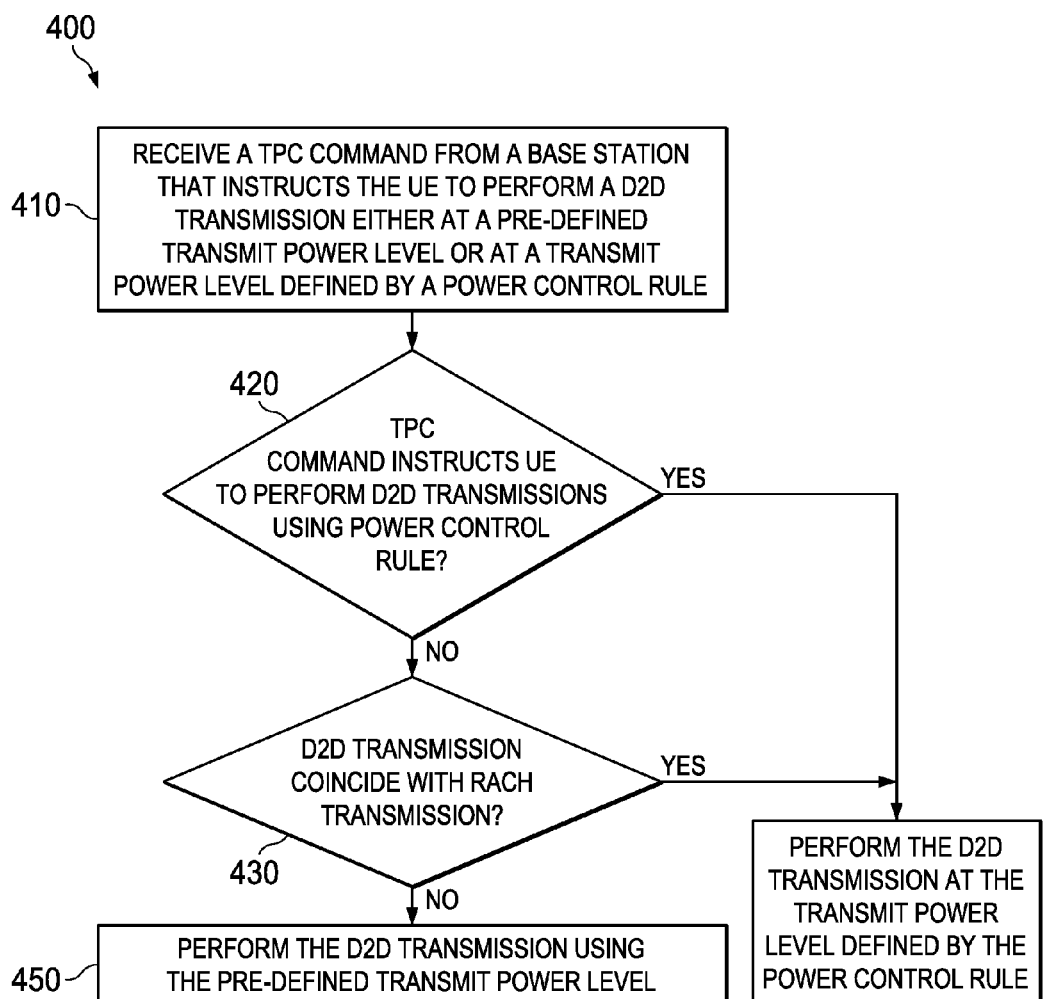
FIG. 4 illustrates a flow chart of an embodiment method for performing D2D transmissions.

FIG. 4 illustrates a flow chart of an embodiment method 400 for performing D2D transmissions, as might be performed by a UE. As shown, the method 400 begins at step 410, where a UE receives a TPC command from a base station that instructs the UE to perform a D2D transmission either at a pre-defined transmit power level or at a transmit power level defined by a power control rule. Thereafter, the method 400 proceeds to step 420, where the UE determines whether the TPC command instructs the UE to perform D2D transmission using the power control rule. If so, the method 400 proceeds to step 440, where the UE performs the D2D transmission at the transmit power level defined by the power control rule. Alternatively, if the TPC command instructs the UE not to perform D2D transmission using a power control rule, the method 400 proceeds to step 430, where the UE determines whether D2D transmission coincides with a random access channel (RACH) transmission. If so, the method 400 proceeds to step 440. A D2D transmission may coincide with a RACH transmission when the D2D transmission collides, or significantly interferes, with the RACH transmission. Alternatively, if the D2D transmission does not coincide with the RACH transmission, then the method 400 proceeds to step 450, where the UE performs D2D transmission using the pre-defined transmit power level. For instance, in some embodiments the D2D transmission may be performed over time-frequency resources of a D2D communication channel, e.g., a physical sidelink shared channel (PSSCH). In some embodiments, the UE may not consider whether the D2D transmission coincides with a RACH transmission. In such embodiments, step 430 is omitted, and the method 400 proceeds to step 450 when the TPC command instructs the UE not to perform D2D transmission using a power control rule.

Figure 5:
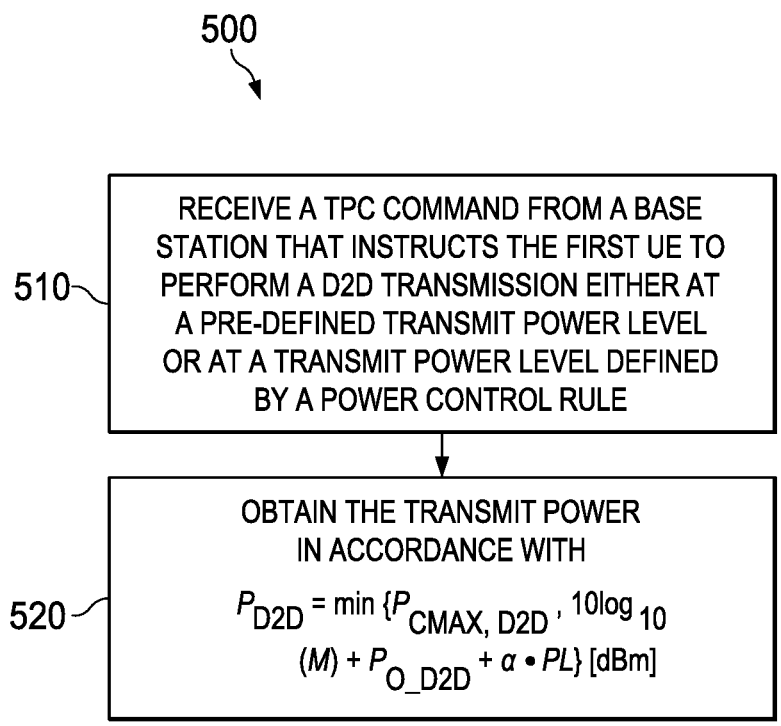
FIG. 5 illustrates a flow chart of an embodiment method for setting a transmit power level.

FIG. 5 illustrates a flow chart of an embodiment method 500 for setting a transmit power level, as might be performed by a UE. As shown, the method 500 begins at step 510, where the UE receives a TPC command from a base station. In an embodiment, the UE performs a D2D transmission at a pre-defined transmit power level when the TPC command instructs the UE to perform the D2D transmission at the pre-defined transmit power level. In another embodiment, the UE performs a D2D transmission at a transmit power level defined by a transmit power control rule when the TPC command instructs the UE to perform the D2D transmission in accordance with the transmit power control rule. Subsequently, the method 500 proceeds to step 520, where the UE obtains the transmit power level in accordance with the equation $P_{D2D}=\min\{P_{CMAX,D2D}, 10\log_{10}(M)+P_{O\_D2D,1}+\alpha \cdot PL\}$ [dBm], where $P_{D2D}$ is the transmit power level used by the UE to perform the D2D transmission, $P_{CMAX,D2D}$ is the maximum power the UE can transmit on the D2D communication channel when the open loop power control rule is used, M is a bandwidth of a D2D communication channel resource assignment, PL is a downlink path loss estimate calculated for a serving cell, and $P_{O\_D2D}$ and $\alpha$ are provided by higher layer parameters. In some embodiments, the D2D communication channel is a PSSCH. In such embodiments, the above equation may be rewritten as $P_{PSSCH}=\min\{P_{CMAX,PSSCH}, 10\log_{10}(M_{PSSCH})+P_{O_{PSSCH,1}}+\alpha_{PSSCH,1} \cdot PL\}$, where $P_{CMAX,PSSCH}$ is the maximum power the UE can transmit on the PSSCH when the open loop power control rule is used, $M_{PSSCH}$ is a bandwidth of a PSSCH resource assignment, PL is a downlink path loss estimate calculated for a serving cell, and $P_{O\_PSSCH,1}$ and $\alpha_{PSSCH,1}$ are provided by higher layer parameters.

Figure 6:
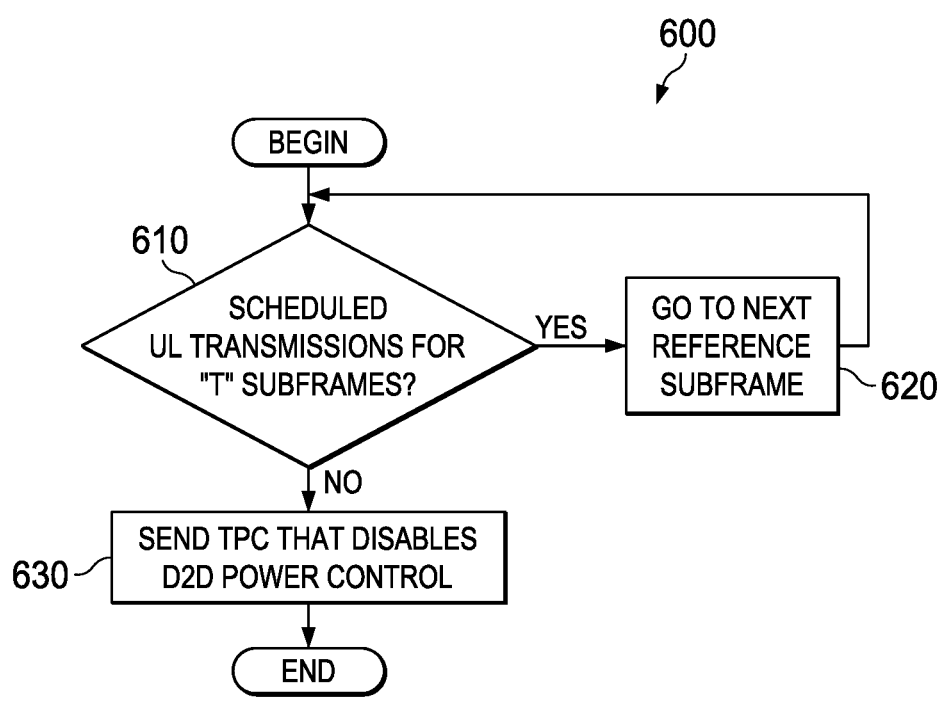
FIG. 6 illustrates a flow chart of an embodiment method for transmitting a transmit power control (TPC) command to a UE.

FIG. 6 illustrates a flow chart of an embodiment method 600 for transmitting a transmit power control (TPC) command to a UE. As shown, the method 600 begins at step 610, where an eNB determines whether uplink transmissions have been scheduled from UEs in its cell for a specific period (e.g., T subframes). If the eNB determines that at least one UL transmission is scheduled during the specific period, then the method 600 proceeds to step 620, where the eNB instructs the UE to perform D2D transmissions at a transmit power level defined by a transmit power control rule. In some embodiments, the eNB expressly instructs the UE to use a transmit power control rule by transmitting a TPC command that instructs the UE to use a transmit power control rule. In other embodiments, the UE has previously been instructed to use a transmit power control rule unless further notice is received (e.g., via a TPC command disabling D2D power control). In such embodiments, the eNB implicitly instructs the UE to continue using the transmit power control rule by not transmitting a TPC command disabling a D2D power control rule. During step 610, if the eNB determines that UL transmissions are not scheduled during the specific period, then the method 600 proceeds to step 630, where the eNB sends the TPC command to instruct the UE to perform D2D transmissions at a pre-defined transmit power level (e.g., a maximum transmit power level). In another embodiment, the eNB instructs the UE to perform D2D transmissions at a fixed transmit power level to provide larger range D2D transmissions irrespective of their interference with uplink transmissions received by the eNB or other wireless communications.

Figure 7:
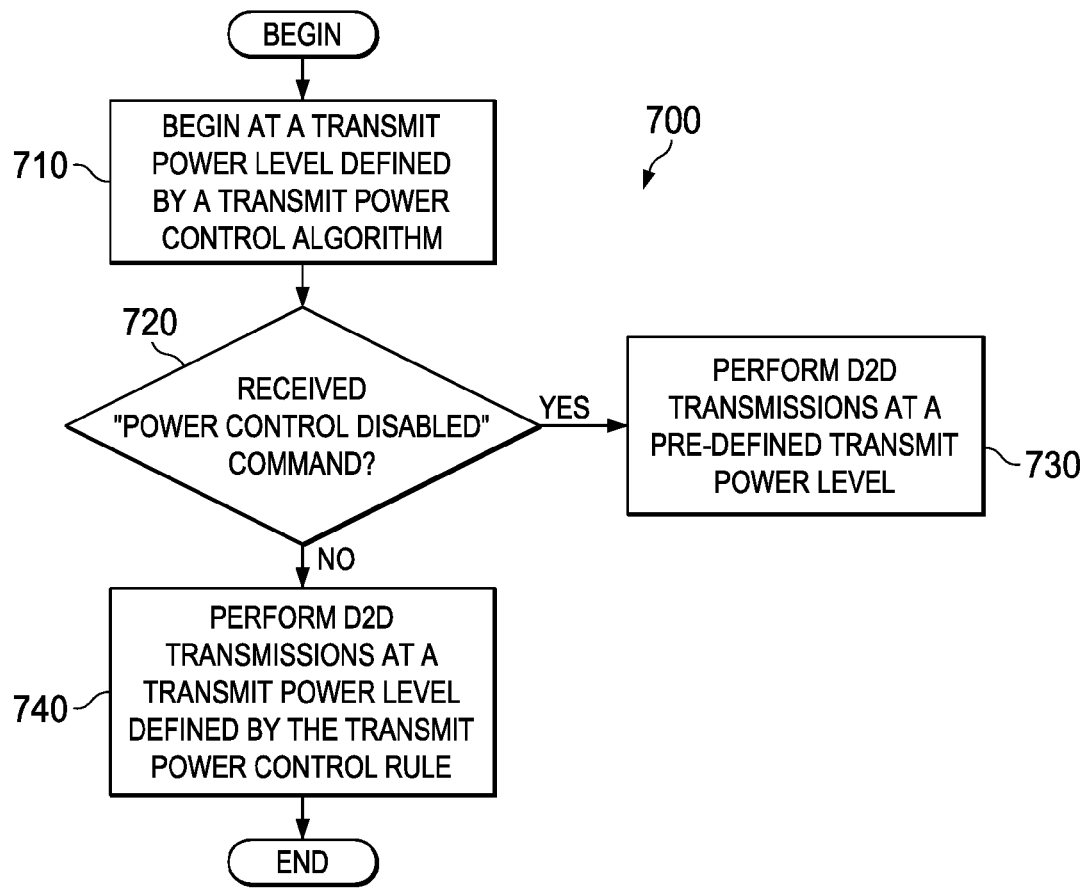
FIG. 7 illustrates a flow chart of an embodiment method for performing D2D transmissions.

FIG. 7 illustrates a flow chart of an embodiment method 700 for performing D2D transmissions. As shown, the method 700 begins at step 710, where a UE begins performing D2D transmissions at a transmit power level defined by a transmit power control rule. Thereafter, the method proceeds to step 720, where the UE determines whether a TPC command disabling the transmit power control rule has been received. If so, the method 700 proceeds to step 730, where the UE performs D2D transmissions at a pre-defined transmit power level. Alternatively, if a TPC command disabling the transmit power control rule has not been received, then the method 700 proceeds to step 740, where the UE performs D2D transmissions at the transmit power level defined by the transmit power control rule.

Figure 8:
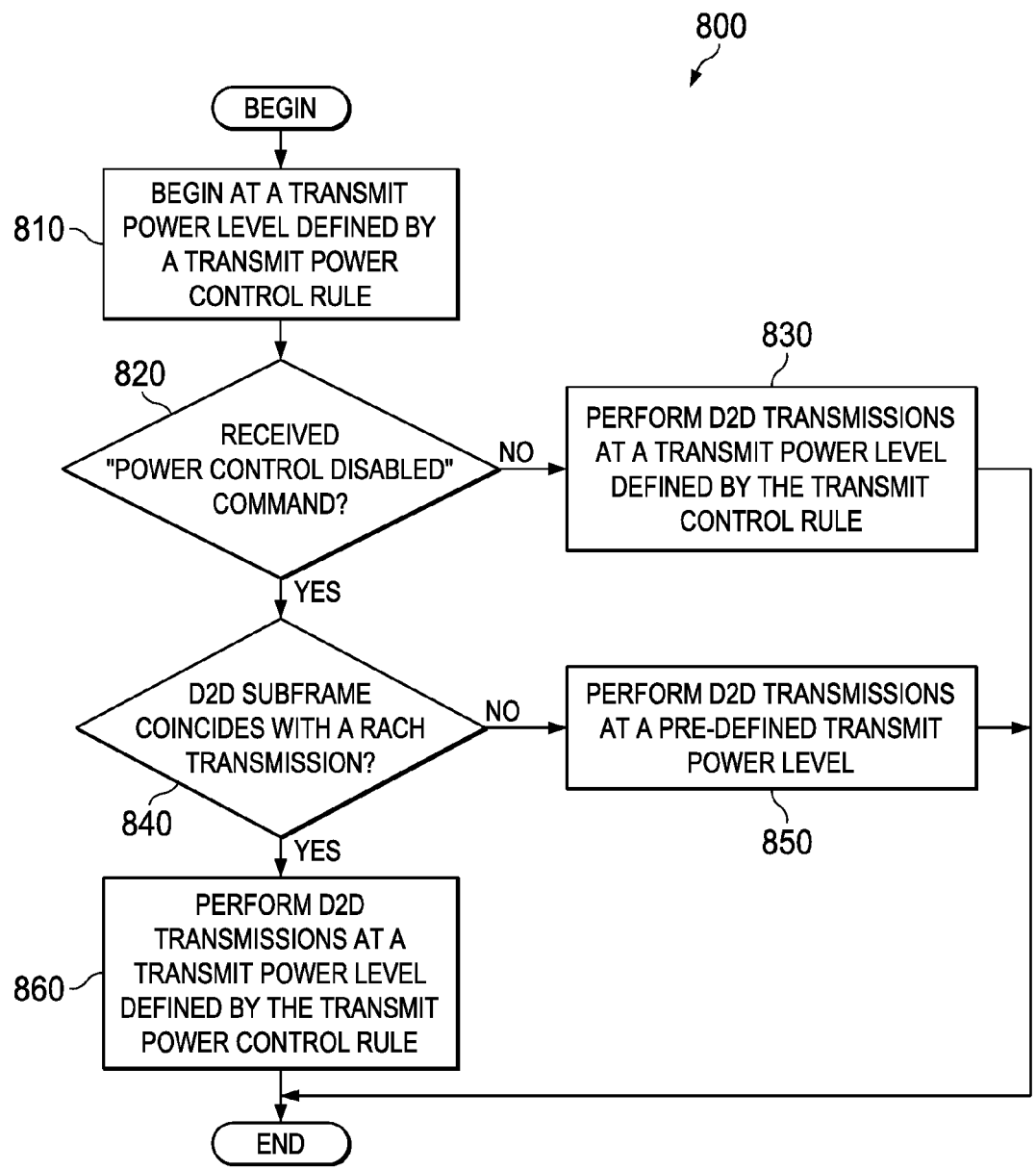
FIG. 8 illustrates a flow chart of another embodiment method for performing D2D transmissions.

FIG. 8 illustrates a flow chart of another embodiment method 800 for performing D2D transmissions associated with a random access channel (RACH) transmission. As shown, the method 800 begins at step 810, where a UE begins performing D2D transmissions at a transmit power level defined by a transmit power control rule. Thereafter, the method 800 proceeds to step 820, where the UE determines whether a TPC command disabling the transmit power control rule has been received. If not, the method 800 proceeds to step 830, where the UE performs D2D transmissions at the transmit power level defined by the transmit power control rule. Alternatively, if a TPC command disabling the transmit power control rule has been received, then the method 800 proceeds to step 840, where the UE determines the D2D transmissions would coincide (e.g., collide) with a random access channel (RACH) transmission. If not, the method 800 proceeds to step 850, where the UE performs D2D transmissions using a pre-defined transmit power level. Alternatively, if the D2D transmission would coincide with a RACH transmission, then the method 800 proceeds to step 860, where the UE performs the D2D transmission at the transmit power level defined by the transmit power control rule.

Figure 9:
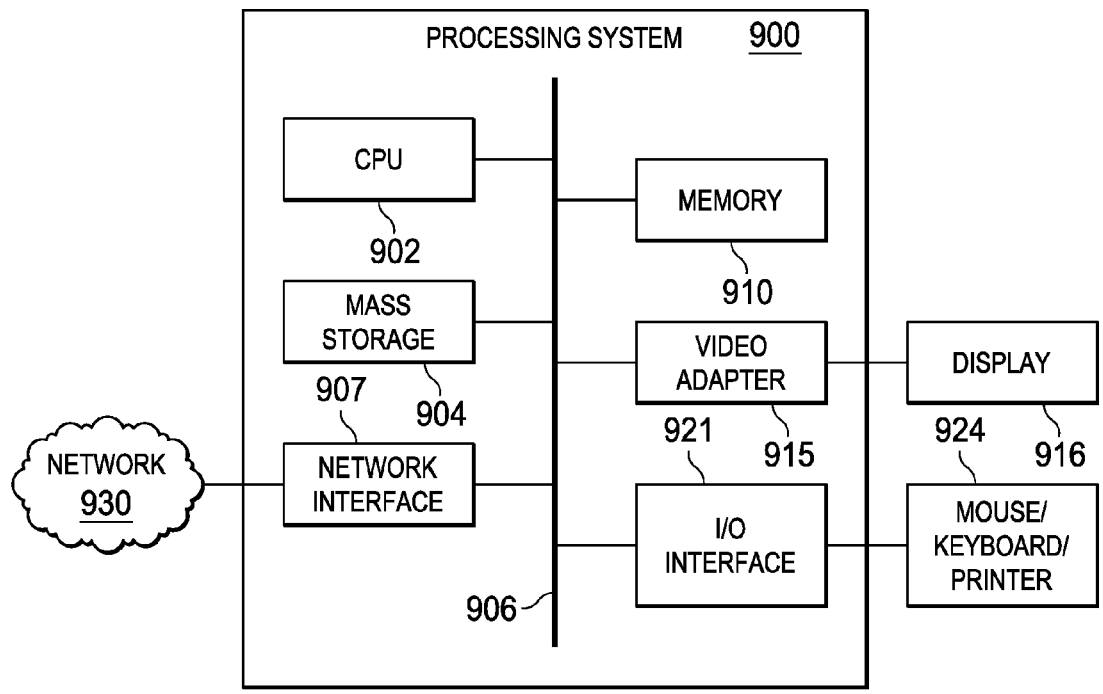
FIG. 9 illustrates a block diagram of an embodiment communications device.

FIG. 9 is a block diagram of a processing system 900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 900 may comprise a processing unit equipped with one or more input/output devices, such as a speaker, microphone, mouse 924, touchscreen, keypad, keyboard 924, printer 924, display 916, and the like. The processing system 900 may include a central processing unit (CPU) 902, memory 910, a mass storage device 904, a video adapter 915, and an I/O interface 921, all connected to a bus 906.

The bus 906 may be one or more of any type of several bus architectures including a memory bus or memory controller, a peripheral bus, video bus, or the like. The CPU 902 may comprise any type of electronic data processor. The memory 910 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 910 may include ROM for use at boot-up, and DRAM for program and data storage for use while executing programs.

The mass storage device 904 may comprise any type of non-transitory storage device configured to store data, programs, and other information and to make the data, programs, and other information accessible via the bus 906. The mass storage device 904 may comprise, for example, one or more of a solid state drive, hard disk drive, a magnetic disk drive, an optical disk drive, or the like.

The video adapter 915 and the I/O interface 921 provide interfaces to couple external input and output devices to the processing system 900. As illustrated, examples of input and output devices include the display 916 coupled to the video adapter 915 and the mouse/keyboard/printer 924 coupled to the I/O interface 921. Other devices may be coupled to the processing system 900, and additional or fewer interfaces or interface cards may be utilized. For example, a serial interface such as Universal Serial Bus (USB) (not shown) may be used to provide an interface for a printer 924.

The processing system 900 also includes one or more network interfaces 907, which may comprise wired links, such as an Ethernet cable or the like, and/or wireless links to access nodes or different networks 930. The network interface 907 allows the processing system 900 to communicate with remote units via the networks 930. For example, the network interface 907 may provide wireless communication via one or more transmitters/transmit antennas and one or more receivers/receive antennas. In an embodiment, the processing system 900 is coupled to a local-area network 930 or a wide-area network 930 for data processing and communications with remote devices, such as other processing units, the Internet, remote storage facilities, or the like.

Figure 10:
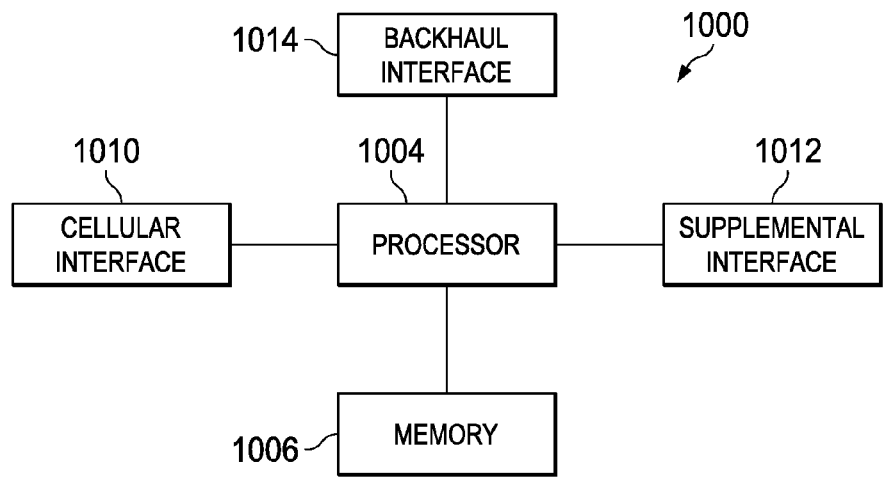
FIG. 10 illustrates a block diagram of an embodiment computing platform.

FIG. 10 illustrates a block diagram of an embodiment of a communications device 1000, which may be equivalent to one or more devices (e.g., requesting devices, candidate devices, network nodes, etc.) discussed above. The communications device 1000 may include a processor 1004, a memory 1006, a cellular interface 1010, a supplemental interface 1012, and a backhaul interface 1014, which may (or may not) be arranged as shown in FIG. 10. The processor 1004 may be any component capable of performing computations and/or other processing related tasks, and the memory 1006 may be any component capable of storing programming and/or instructions for the processor 1004. The cellular interface 1010 may be any component or collection of components that allows the communications device 1000 to communicate using a cellular signal, and may be used to receive and/or transmit information over a cellular connection of a cellular network. The supplemental interface 1012 may be any component or collection of components that allows the communications device 1000 to communicate data or control information via a supplemental protocol. For instance, the supplemental interface 1012 may be a non-cellular wireless interface for communicating in accordance with a Wireless-Fidelity (Wi-Fi) or Bluetooth protocol. Alternatively, the supplemental interface 1012 may be a wireline interface. The backhaul interface 1014 may be optionally included in the communications device 1000, and may comprise any component or collection of components that allows the communications device 1000 to communicate with another device via a backhaul network.

The following references are related to subject matter of the present application. Each of these references is incorporated herein by reference in its entirety:

3GPP specification 36.213;
3GPP RAN1 Chairman Notes, RAN1#76;
3GPP RAN1 Chairman Notes, RAN1#76bis;
3GPP RAN1 Chairman Notes, RAN1#73.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for power control command for device-to-device (D2D) communications in a wireless communication network, the method comprising:

establishing, by a base station, a link with a user equipment (UE) in a cell, wherein the UE is configured to perform D2D transmissions to one or more UEs;

sending, by the base station, a first transmit power control (TPC) command to the UE, the first TPC command instructing the UE to perform a first D2D transmission at a pre-defined transmit power level over first time-frequency resources available to carry the first D2D transmission; and sending, by the base station, a second TPC command to the UE, the second TPC command instructing the UE to perform a second D2D transmission at a transmit power level defined by a power control rule over second time-frequency resources available to carry the second D2D transmission, the transmit power level defined by the power control rule being lower than the pre-defined transmit power level.

2. The method of claim 1, wherein each TPC command is valid for a specific period.

3. The method of claim 2, wherein the specific period comprises one or more subframes.

4. The method of claim 2, wherein the specific period is communicated from the base station to the UE via higher layer signaling.

5. The method of claim 1, wherein parameters of the power control rule are configured by higher layer signaling.

6. The method of claim 1, wherein the power control rule comprises an open-loop power control rule.

7. The method of claim 1, wherein the TPC commands are communicated using a downlink control information (DCI) format.

8. The method of claim 7, wherein the TPC commands are transmitted on a physical downlink control channel (PDCCH).

9. The method of claim 7, wherein the TPC commands are transmitted on an enhanced physical downlink control channel (EPDCCH).

10. The method of claim 7, wherein the DCI format associates the TPC commands with the UE by carrying a radio network temporary identifier (RNTI).

11. The method of claim 1, wherein the power control rule is in accordance with at least one uplink transmission scheduled to be received by the base station over second time-frequency resources available to carry the second D2D transmission.

12. A base station for power control command for device-to-device (D2D) communications in a wireless communication network, the base station comprising:
    a processor; and
    a non-transitory computer readable storage medium storing programming for execution by the processor, the programming including instructions configuring the base station to:
    establish a link with a user equipment (UE) in a cell, wherein the UE is configured to perform D2D transmissions to one or more UEs;
    send a first transmit power control (TPC) command to the UE, the first TPC command instructing the UE to perform a first D2D transmission to the one or more UEs at a pre-defined transmit power level over first time-frequency resources available to carry the first D2D transmission; and
    send a second TPC command to the UE, the second TPC command instructing the UE to perform a second D2D transmission at a transmit power level defined by a power control rule over second time-frequency resources available to carry the second D2D transmission, the transmit power level defined by the power control rule being lower than the pre-defined transmit power level.

13. The base station of claim 12, wherein the TPC commands are communicated using a downlink control information (DCI) format.

14. The base station of claim 13, wherein the TPC commands are transmitted on a physical downlink control channel (PDCCH).

15. The base station of claim 13, wherein the TPC commands are transmitted on an enhanced physical downlink control channel (EPDCCH).

16. The base station of claim 13, wherein the DCI format associates the TPC commands with the UE by carrying a radio network temporary identifier (RNTI).

17. The base station of claim 12, wherein each TPC command is valid for a specific period.

18. The base station of claim 17, wherein the specific period comprises one or more subframes.

19. The base station of claim 17, wherein the specific period is communicated from the base station to the UE via higher layer signaling.

20. The base station of claim 12, wherein parameters of the power control rule are configured by higher layer signaling.

21. The base station of claim 12, wherein the power control rule comprises an open-loop power control rule.

22. The base station of claim 12, wherein the power control rule is in accordance with at least one uplink transmission scheduled to be received by the base station over second time-frequency resources available to carry the second D2D transmission.

* * * * *